United States Patent
Lee

(10) Patent No.: US 11,720,413 B2
(45) Date of Patent: Aug. 8, 2023

(54) SYSTEMS AND METHODS FOR VIRTUALIZING FABRIC-ATTACHED STORAGE DEVICES

(71) Applicant: Samsung Electronics Co., Ltd., Suwon-si (KR)

(72) Inventor: Ronald Lee, Pleasanton, CA (US)

(73) Assignee: SAMSUNG ELECTRONICS CO., LTD.

(*) Notice: Subject to any disclaimer, the term of this patent is extended or adjusted under 35 U.S.C. 154(b) by 58 days.

(21) Appl. No.: 16/896,201

(22) Filed: Jun. 8, 2020

(65) Prior Publication Data

US 2021/0382663 A1    Dec. 9, 2021

(51) Int. Cl.
  *G06F 15/16* (2006.01)
  *G06F 9/54* (2006.01)
  *H04L 29/06* (2006.01)
  *G06F 9/50* (2006.01)
  *H04L 101/663* (2022.01)

(52) U.S. Cl.
  CPC ...... *G06F 9/5083* (2013.01); *H04L 2101/663* (2022.05)

(58) Field of Classification Search
  CPC .............................. G06F 9/5083; H04L 61/606
  USPC ......................................................... 709/230
  See application file for complete search history.

(56) References Cited

U.S. PATENT DOCUMENTS

| | | | |
|---|---|---|---|
| 9,430,412 B2 | 8/2016 | Huang | |
| 10,282,094 B2 | 5/2019 | Kachare et al. | |
| 10,311,008 B2* | 6/2019 | Worley | G06F 13/4068 |
| 10,365,981 B2* | 7/2019 | Marripudi | G06F 11/2035 |
| 10,372,659 B2* | 8/2019 | Olarig | G06F 13/4234 |
| 10,425,473 B1* | 9/2019 | Patel | H04L 67/1031 |
| 10,628,353 B2* | 4/2020 | Prabhakar | G06F 3/067 |
| 10,635,316 B2* | 4/2020 | Singh | H04L 67/1097 |
| 10,790,036 B1* | 9/2020 | Zhou | G11C 11/5642 |

(Continued)

FOREIGN PATENT DOCUMENTS

WO    2016196766 A2    12/2016

OTHER PUBLICATIONS

UNVMe-TCP: A User Space Approach to Optimizing NVMe over Fabrics TCP Transport Ziye Yang, Qun WanGang CaoKarol Latecki First Online: Jan. 19, 2020 (Year: 2020).*

*Primary Examiner* — Hamza N Algibhah
(74) *Attorney, Agent, or Firm* — Renaissance IP Law Group LLP

(57) ABSTRACT

Disclosed are systems and methods of providing virtualized storage that may include establishing, through a load balancer, a transport connection between a device and a group of fabric-attached storage devices, and transferring data between the device and the group of fabric-attached storage devices through the transport connection using a transport protocol, wherein the group of fabric-attached storage devices comprises two or more fabric-attached storage devices and is accessed by the device as a logical storage device. A storage device may include a storage medium, a network fabric interface, and a storage controller configured to transfer data between the storage medium and a device through the network fabric interface over a transport connection, wherein the storage controller is configured to share the transport connection with another data storage device that is fabric-attached.

17 Claims, 9 Drawing Sheets

(56) References Cited

U.S. PATENT DOCUMENTS

| | | | |
|---|---|---|---|
| 10,853,233 B2 * | 12/2020 | Hashimoto | G06F 3/061 |
| 10,958,729 B2 * | 3/2021 | Kumar | H04L 41/0803 |
| 10,992,967 B2 * | 4/2021 | Colenbrander | G06F 3/061 |
| 11,003,539 B2 * | 5/2021 | Krasner | G06F 11/0793 |
| 2003/0056063 A1 * | 3/2003 | Hochmuth | H04L 67/1097 711/152 |
| 2014/0201431 A1 | 7/2014 | Woo | |
| 2015/0169244 A1 | 6/2015 | Asnaashar et al. | |
| 2015/0254088 A1 * | 9/2015 | Chou | G06F 3/061 709/212 |
| 2016/0127468 A1 * | 5/2016 | Malwankar | G06F 9/45558 709/212 |
| 2016/0127492 A1 * | 5/2016 | Malwankar | H04L 67/1097 709/212 |
| 2016/0188528 A1 * | 6/2016 | Haghighi | G06F 3/0631 709/212 |
| 2016/0335216 A1 | 11/2016 | Krishnan et al. | |
| 2017/0012904 A1 * | 1/2017 | Matzek | H04L 67/1002 |
| 2017/0024334 A1 | 1/2017 | Bergsten et al. | |
| 2017/0177222 A1 * | 6/2017 | Singh | G06F 9/45558 |
| 2017/0277432 A1 * | 9/2017 | Yun | G06F 3/0659 |
| 2018/0095915 A1 * | 4/2018 | Prabhakar | H04L 47/36 |
| 2018/0307650 A1 * | 10/2018 | Kachare | G06F 15/17331 |
| 2018/0337991 A1 * | 11/2018 | Kumar | H04L 67/1097 |
| 2019/0042591 A1 * | 2/2019 | Ben Dayan | G06F 16/13 |
| 2019/0174155 A1 * | 6/2019 | Colenbrander | H04N 21/2405 |
| 2019/0222649 A1 * | 7/2019 | Cheng | G06F 15/17331 |
| 2019/0332314 A1 * | 10/2019 | Zhang | G06F 3/0604 |
| 2020/0050385 A1 * | 2/2020 | Furey | G06F 3/0616 |
| 2020/0162385 A1 * | 5/2020 | Thiagarajan | H04L 43/0876 |
| 2020/0177660 A1 * | 6/2020 | Connor | H04L 47/34 |
| 2020/0210069 A1 * | 7/2020 | Singh | H04L 67/1097 |
| 2020/0241927 A1 * | 7/2020 | Yang | H04L 69/16 |
| 2020/0252319 A1 * | 8/2020 | Specht | H04L 45/02 |
| 2020/0257629 A1 * | 8/2020 | Pinto | G06F 12/0246 |
| 2021/0208805 A1 * | 7/2021 | Beckett | G06F 3/0635 |
| 2021/0216228 A1 * | 7/2021 | Mallick | G06F 3/0635 |
| 2021/0286745 A1 * | 9/2021 | Smith | G06F 13/404 |
| 2021/0306295 A1 * | 9/2021 | Sethuraman | G06F 21/105 |

* cited by examiner

SYSTEMS AND METHODS FOR VIRTUALIZING FABRIC-ATTACHED STORAGE DEVICES

TECHNICAL AREA

This disclosure relates generally to storage devices, and specifically to systems and methods for virtualizing fabric-attached storage devices.

BACKGROUND

A fabric-attached storage device may include a network interface that may enable the storage device to communicate directly with a host through a network fabric such as Ethernet. A fabric-attached solid state drive (SSD) may use a storage protocol such as Nonvolatile Memory Express Over Fabric (NVMe-oF) to transfer data through a network fabric.

The above information disclosed in this Background section is only for enhancement of understanding of the background of the invention and therefore it may contain information that does not constitute prior art.

SUMMARY

A method of providing virtualized storage may include establishing, through a load balancer, a transport connection between a device and a group of fabric-attached storage devices, and transferring data between the device and the group of fabric-attached storage devices through the transport connection using a transport protocol, wherein the group of fabric-attached storage devices comprises two or more fabric-attached storage devices and is accessed by the device as a logical storage device. The group of fabric-attached storage devices may share a network address. At least two of the group of fabric-attached storage devices may use different network ports for the network address. The network address may include an Internet Protocol (IP) address. The transport protocol may include Transmission Control Protocol (TCP). The device and the group of fabric-attached storage devices may exchange data using a Nonvolatile Memory Express Over Fabric (NVMe-oF) protocol. A receive window space of the transport connection may be shared between at least two of the group of fabric-attached storage devices. At least two of the group of fabric-attached storage devices may transfer data to the device using at least a first transport protocol sequence number and a second transport protocol sequence within the transport connection in response to a read command. One of the group of fabric attached storage devices may accumulate one or more acknowledgements from the device in response to the device receiving read data. The load balancer may transfer data from the device directly to one or more of the group of fabric attached storage devices using the transport connection for a write operation. For a write operation, the load balancer may transfer write data from the device to a first one of the group of fabric attached storage devices, and the first one of the group of fabric attached storage devices transfers at least part of the write data from the device to a second one of the group of fabric attached storage devices. The first one of the group of fabric attached storage devices may determine a distribution of the write data between the group of fabric attached storage devices.

A storage system may include a first fabric-attached storage device, a second fabric-attached storage device, and a load balancer connected to the first and second fabric attached storage devices through a network fabric, wherein the load balancer is configured to transfer data between a device and the first and second fabric-attached storage devices using a transport connection that is shared between the first and second fabric-attached storage devices. The load balancer may be configured to transfer data between the device and the first and second fabric-attached storage devices using a shared window space of the transport connection. The first and second fabric-attached storage devices may be configured to operate as a logical storage device. The load balancer and the first and second fabric-attached storage devices are configured to share a network address between the first and second fabric-attached storage devices.

A storage device may include a storage medium, a network fabric interface, and a storage controller configured to transfer data between the storage medium and a device through the network fabric interlace over a transport connection, wherein the storage controller is configured to share the transport connection with another data storage device that is fabric-attached. The storage controller may include logic configured to send a message to the other data storage device in response to a read command from the device, and the message includes information to enable the other data storage device to transfer read data to the device using the transport connection. The storage controller may include logic configured to receive a message from the other data storage device, and the message may include information to enable the data storage device to transfer read data to the device using the transport connection. The storage controller may include logic configured to determine a distribution of write data between the data storage device and the other data storage device. The storage controller may include logic configured to send read data to a third-party device in response to a read command from the device.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
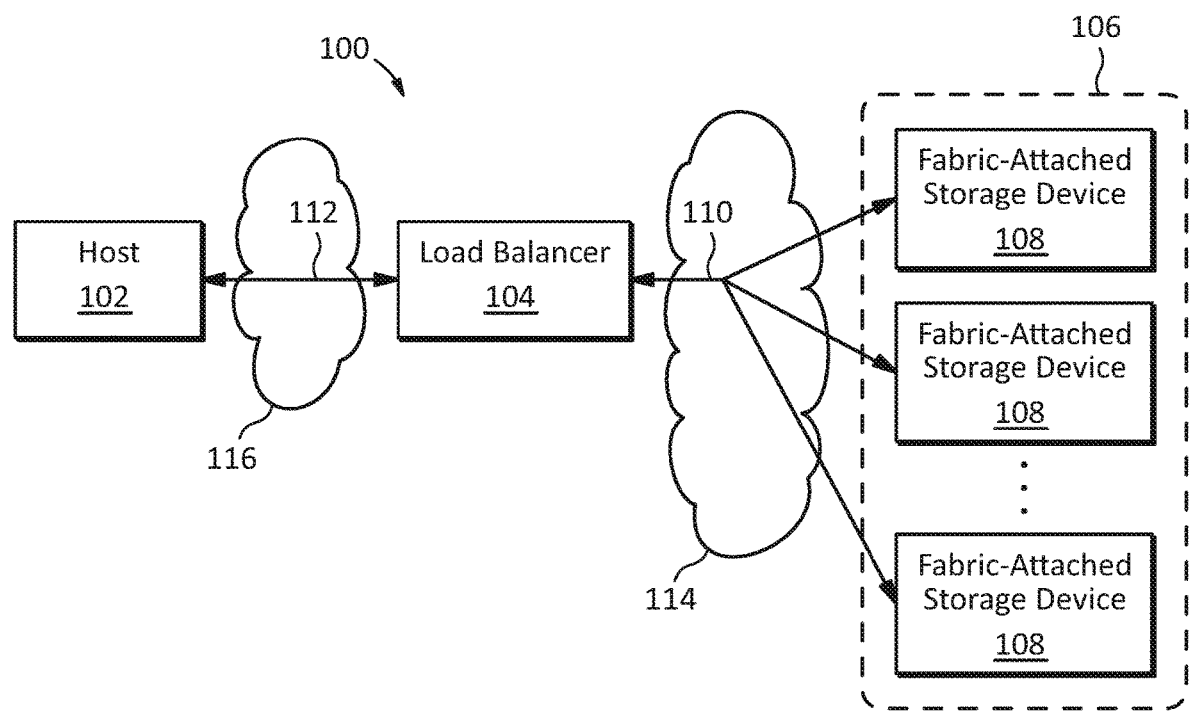
FIG. 1 illustrates an embodiment of a storage system including one or more load balancers arranged between one or more hosts and a group of fabric-attached storage devices according to this disclosure.

In some embodiments, fabric-attached storage devices may use one or more transport protocols that may only provide individual connections between a host and multiple storage devices. That is, there may be a 1:1 mapping between a host and each storage device. Therefore, to distribute data across multiple fabric-attached devices, a host may need to manage multiple transport connections with multiple storage devices. Moreover, management of volumes spanning multiple storage devices may be implemented in a software stack at the host. These management tasks, along with a resulting increase in the number of input/output (I/O) operations, may cause the host to consume more resources such as central processing unit (CPU) power, CPU overhead, memory, and/or the like.

In some embodiments according to this disclosure, a group of fabric-attached storage devices may be virtualized as an aggregated volume and thus enable a host to access the group as a single logical storage device. This transparent virtualization may be achieved, for example, by using a load balancer to share a network address and/or distribute a transport connection across the group of storage devices. In some embodiments, data may be transferred between the host and one or more individual fabric-attached storage devices without peer-to-peer data transfers between the storage devices within the aggregated group.

In some embodiments, one or more fabric-attached storage devices may be capable of transferring data through a network fabric such as Ethernet, Fibre Channel, InfiniBand, and/or the like. In some embodiments, the use of a load balancer may enable a group of fabric-attached storage devices to share a network address, e.g., an Internet Protocol (IP) address. For example, the same IP address but different port numbers may be used for each storage device in the group. A shared IP or other network address may be used with one or more transport protocols such as Transmission Control Protocol (TCP), Remote Direct Memory Access (RDMA) Over Converged Ethernet (RoCE), and/or the like. In some embodiments, a host and group of fabric-attached storage devices may use a Nonvolatile Memory Express Over Fabric (NVMe-oF) protocol or any other storage protocol that may operate with the one or more transport protocols used by the load balancer and storage devices.

In some embodiments, the use of a load balancer may enable a group of fabric-attached storage devices to share or distribute a transport connection, for example, by distributing transport window space and/or managing sequence numbers, acknowledgments, transmission requests, completion responses, and/or the like for the transport protocol. A distributed transport connection may be used, for example, to distribute write data from a host to one or more of the fabric-attached storage devices in the group. A distributed transport connection may also be used, for example, to transfer read data from one or more of the fabric-attached storage devices in the group to the host.

In some embodiments, a transport connection may be terminated at one of the fabric-attached storage devices which may operate as a primary storage device for the group. The primary storage device may control and/or manage data transfers between itself and a host, and between the other storage devices in the group and the host. In some embodiments, a load balancer may transfer write data from the host directly to one or more of the storage devices in the group. In some embodiments, data that is transferred directly to one or more of the storage devices in the group may not be transferred through another one of the storage devices in the group. In some embodiments, the load balancer may transfer write data from the host to a primary storage device, which may then forward some or all of the write data to one or more of the other storage devices in the group. Some embodiments may use a combination of direct and forwarded write data transfers.

FIG. 1 illustrates an embodiment of a storage system including one or more load balancers arranged between one or more hosts and a group of fabric-attached storage devices according to this disclosure. The system 100 illustrated in FIG. 1 may be used, for example, to implement any of the methods, apparatus, features, techniques, and/or the like, described in this disclosure. The system 100 may include a load balancer 104, and two or more fabric-attached storage devices 108 configured as a device group 106 which may operate collaboratively as a single logical storage device. Data from one or more hosts 102 may be distributed over the fabric-attached storage devices 108, for example, by operation of one or more shared transport connections 110 as described below. The fabric-attached storage devices 108 may include any type of storage devices such as hard disk drives (HDDs), solid state drives (SSDs), and/or the like, or combination thereof, each having one or more network fabric interfaces. For example, in some embodiments, one or more of the fabric-attached storage devices 108 may be implemented as Ethernet SSDs (ESSDs) which may have an Ethernet interface. In some embodiments, one or more of the fabric-attached storage 108 devices may use an NVMe-oF protocol or any other storage protocol that may operate with the one or more transport protocols used by the load balancer and storage devices.

The fabric-connected storage devices 108 may be physically located in a single chassis, rack, data center, and or the like, or distributed between any combination of chassis, racks, data centers, and/or the like. Datacenters may include a variety of locations including edge datacenters, mobile edge datacenters, ad hoc networks, (Internet-of-Things) IoT-based networks, and/or the like. In some embodiments, the fabric-connected storage devices 108 may be distributed throughout one or more hierarchies of chassis, racks, datacenters, and/or the like, or any combination thereof. Moreover, one or more subsets of a network (e.g., a core datacenter) may control aspects of one or more sub-networks (e.g., edge network) in a hierarchy.

The fabric-attached storage devices 108 may be connected to the load balancer 104 through one or more shared transport connections 110. The load balancer 104 may be connected to the one or more hosts 102 through one or more transport connections 112. The one or more shared transport connections 110 and/or transport connections 112 may be implemented, for example, with TCP, RoCE, and/or the like. The one or more shared transport connections 110 and/or transport connections 112 may be carried over any network fabric 114 and/or 116 which may be implemented, for example, with Ethernet, Fibre Channel, InfiniBand, and/or the like, or any combination thereof, and may include any number and/or configuration of switches, routers, and/or the like.

In some embodiments, the load balancer 104 may establish and/or maintain the one or more shared transport connections 110 and/or transport connections 112. In some embodiments, a transport connection 112 from a host 102 may be passed through the load balancer 104 without termination and continued as a shared transport connection 110. In some embodiments, a transport connection 112 from a host 102 may be terminated at the load balancer 104 which may establish and/or maintain a separate shared transport connection 110 to complete the transport connection between the host 102 and the fabric-attached storage devices 108.

In some embodiments, the load balancer 104 may be implemented with one or more commercially available load balancers with little or no modification to hardware and/or software. In some embodiments, the load balancer may be implemented with one or more load balancers that may include hardware and/or software that may be specifically adapted to implement one or more of the methods, apparatus, features, techniques, and/or the like, described in this disclosure.

In some embodiments, the load balancer 104, fabric-attached storage devices 108, shared transport connections 110, and/or transport connections 112 may operate at layer 4 (e.g., the transport layer) of a system that may conform at least partially to a network model such as the Open Systems Interconnect (OSI) model. In some embodiments, one or more of the load balancers 104 may operate at the transport layer of a system that may conform at least partially to a network model such as the TCP/IP model. In some embodiments, a system according to this disclosure may conform at least partially to more than one network model, or may not conform to any network model.

Some example embodiments of systems, processes, methods, features, techniques and/or the like illustrating some possible implementation details according to this disclosure are described below. These examples are provided for purposes of illustrating the principles of this disclosure, but the principles are not limited to these implementation details. For example, some embodiments may be described in the context of systems that may use NVMe-oF, TCP, Ethernet, ESSDs, and/or the like, but other embodiments according to this disclosure may be implemented with other types of storage, transport, and/or network protocols, storage devices, and/or the like. Moreover, some example embodiments may be illustrated with specific numbers and/or arrangements of components, device groups, devices within device groups, and/or the like, but other embodiments may use different numbers and/or arrangements.

Figure 2:
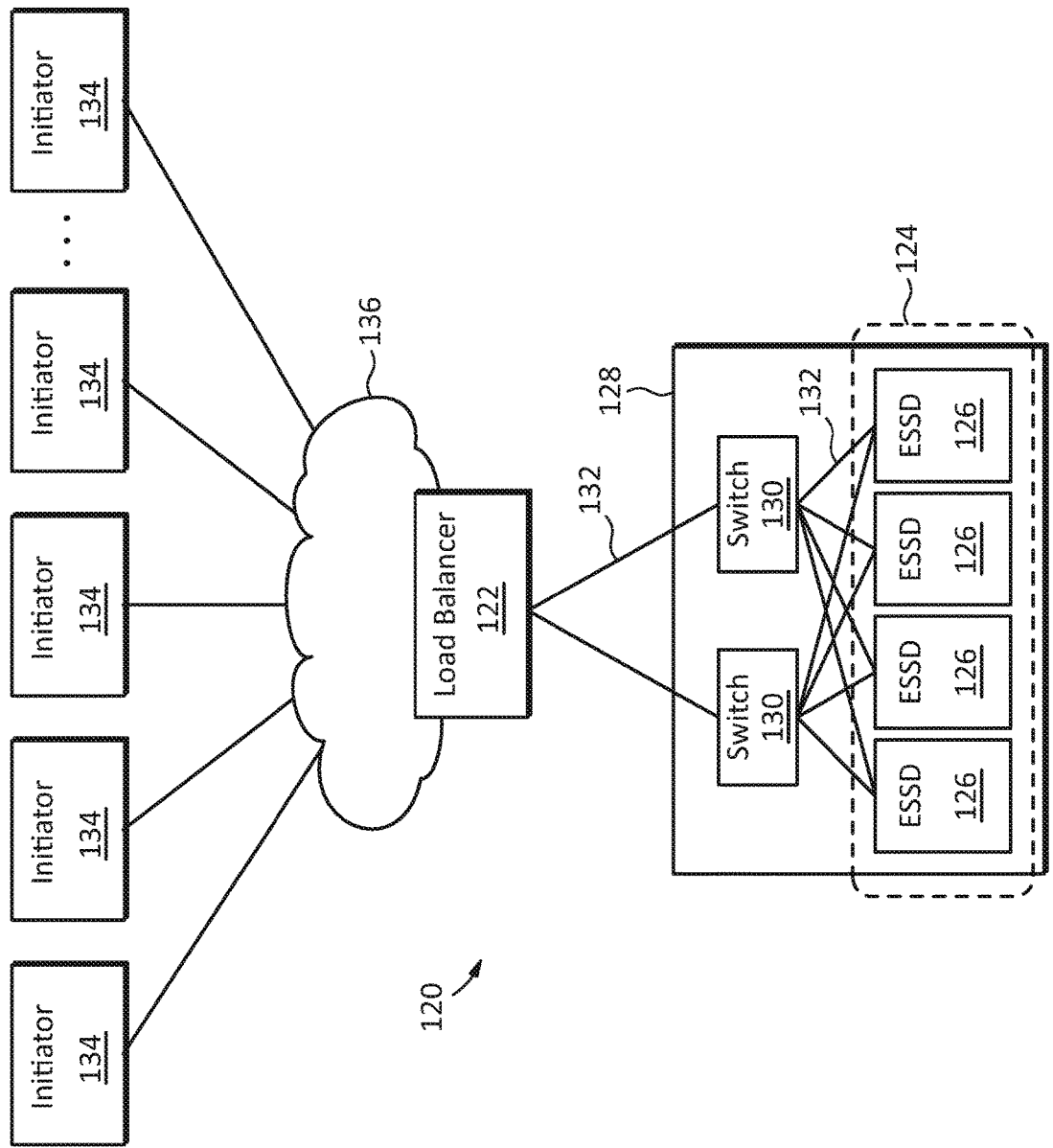
FIG. 2 illustrates an example embodiment of a storage system including one or more load balancers arranged between one or more hosts and a group of fabric-attached storage devices located in a chassis, rack, and/or the like according to this disclosure.

FIG. 2 illustrates an example embodiment of a storage system including one or more load balancers arranged between one or more hosts and a group of fabric-attached storage devices located in a chassis, rack, and/or the like according to this disclosure. The system 120 illustrated in FIG. 2 may include one or more load balancers 122 and two or more ESSDs 126 which may be interconnected through a network fabric that may include one or more Ethernet switches 130 and any number of Ethernet connections 132. In the example illustrated in FIG. 2, the one or more load balancers 122 may be in a separate location from the Ethernet switches 130 and ESSDs 126 which may be located in a chassis 128. In some embodiments, however, one or more of the load balancers 122 may be located in the chassis 128. In other embodiments, the components may be arranged in any other physical configuration.

One or more initiators 134 may be connected to the one or more load balancers 122 through any type of network infrastructure 136 which may include, for example, a public and/or private Internet based on Ethernet, Fibre Channel, InfiniBand, and/or the like, or any combination thereof. The initiators, which may also be referred to as hosts, may include any devices, systems, processes, applications, and/or the like that may use the system 120 to store data.

Two or more of the ESSDs 126 may be configured as a device group 124 which may operate collaboratively so as to enable one or more initiators 134 to access the group 124 as a single logical storage device. Thus, data from an initiator 134 may be distributed across two or more of the ESSDs 126 in a manner that is transparent to the initiator 134.

Data from an initiator 134 may be distributed over the group 124 of ESSDs 126, for example, by operation of one or more TCP connections which may be shared across the group 124. For example, one of the load balancers 124 may establish and/or maintain a TCP connection between an initiator 134 and the group 124 of ESSDs such that the initiator 134 is unaware that the TCP connection is shared by more than one of the ESSDs 126. This may be accomplished, for example, by using the same IP address for all of the ESSDs 126 in the group 124, but using different port numbers for each of the ESSDs 126. The shared or distributed TCP connection may be managed in a coherent manner for example, by distributing TCP window space, by managing TCP sequence numbers, acknowledgments, requests to transmit, completion responses, and/or the like, for input and/or output (I/O) operations.

In some embodiments, NVMe-oF may be used as a storage protocol for data transfers between one or more of the initiators 134 and the group 124 of ESSDs 126. That is, data may be transferred using the NVMe storage protocol, which may carried over the TCP transport protocol, which may be transferred over the Ethernet fabric using the IP network protocol. In other embodiments, however, any other protocols and/or network fabric may be used in place of, or in addition to, those describe above.

Figure 3:
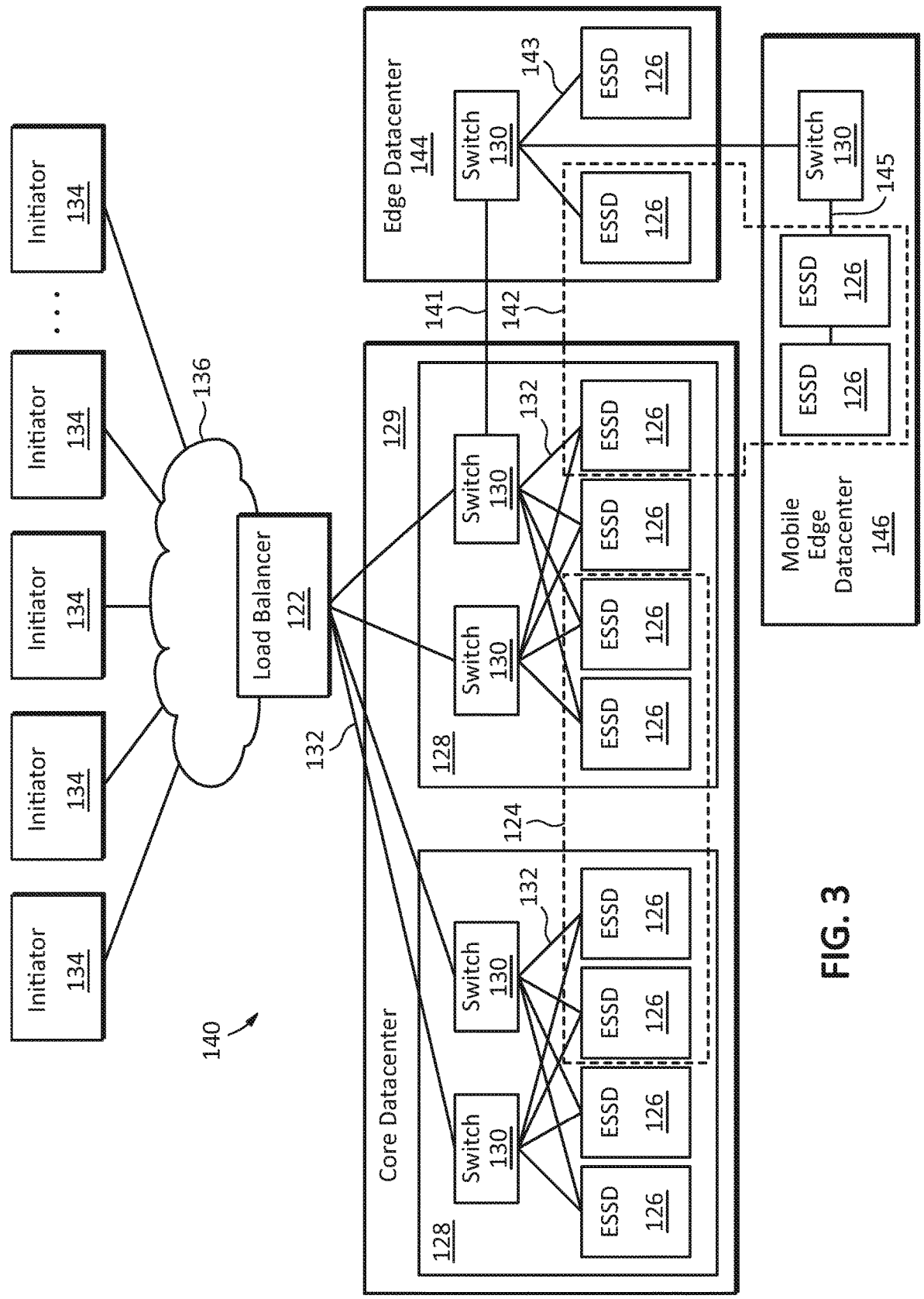
FIG. 3 illustrates another example embodiment of a storage system including one or more load balancers arranged between one or more hosts and a group of fabric-attached storage devices distributed throughout two or more chassis in a core data center and an edge datacenter and mobile edge datacenter, and/or the like according to this disclosure.

FIG. 3 illustrates another example embodiment of a storage system including one or more load balancers arranged between one or more hosts and a group of fabric-attached storage devices distributed throughout two or more chassis in a core datacenter and an edge datacenter and mobile edge datacenter, and/or the like according to this disclosure. The system 140 illustrated in FIG. 3 may include components similar to those illustrated in the system 120 illustrated in FIG. 2. However, in the system 140 illustrated in FIG. 3, a device group 124 of ESSDs 126 (which may, for example, share the same IP address) may be distributed across multiple racks 128 in a core datacenter 129. Another device group 142 may be distributed across one of the chassis 128, an edge datacenter 144, and a mobile edge datacenter 146. The network fabric 132 may extend hierarchically to include sub-network fabrics 141, 143, and 145. In other embodiments, a device group may be distributed between any combination of chassis, racks, data centers of any type, and/or the like, and any number of device groups may be used.

Figure 4:
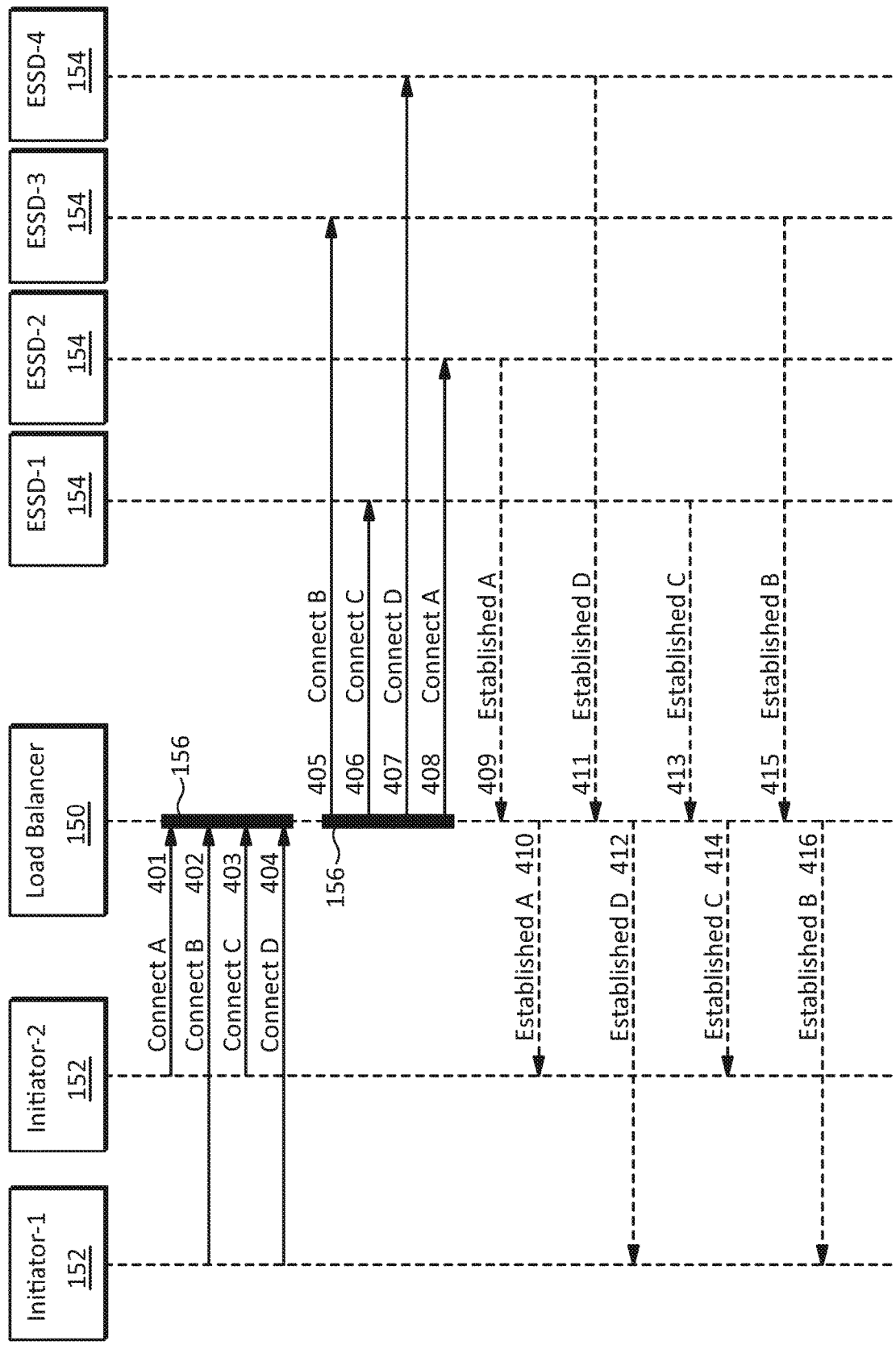
FIG. 4 illustrates a sequence diagram for an example embodiment of a method for distributing transport connections between one or more initiators and two or more fabric-attached storage devices according to this disclosure.

FIG. 4 illustrates a sequence diagram for an example embodiment of a method for distributing transport connections between one or more initiators and two or more fabric-attached storage devices according to this disclosure. The method illustrated in FIG. 4 may be used, for example, with any of the systems and/or components described in this disclosure such as those illustrated in FIGS. 1-3 and 8-9.

In the embodiment illustrated in FIG. 4, a load balancer 150 may distribute transport connections, for example, TCP connections, between initiators 152 and fabric-attached storage devices (e.g., ESSDs) 154. The method may begin with the load balancer 150 receiving connection request Connect A from Initiator-2 at operation 401, connection request Connect B from Initiator-1 at operation 402, connection request Connect C from Initiator-2 at operation 403, and connection request Connect D from Initiator-1 at operation 404. The connection requests may be queued in a buffer 156 while the load balancer 150 determines how to distribute the connection requests to the ESSDs 154.

The load balancer 150 may distribute the connection requests based on a wide variety of factors. For example, in some embodiments, the load balancer 150 may base the distribution of connections at least in part on a connection-type load balancing algorithm such as round robin, least connections, random distribution, and/or the like, or any combination thereof. In some embodiments, the load balancer 150 may base the distribution of connections at least in part on the amount of storage available at the various ESSDs 154. In some embodiments, the ESSDs 154 (e.g., ESSD-1, ESSD-2, ESSD-3, and ESSD-4) may form a device group that may be accessed as a single logical device. In some embodiments, one or more of the ESSDs 154 may be associated with one or more additional ESSDs which, though not illustrated in FIG. 4, may form a device group that may be accessed as a single logical device with the corresponding one of the ESSDs 154. In some embodiments, the load balancer 150 may base the distribution of connections on the amount of storage available at a device group associated with one or more of the ESSDs 154. In some embodiments, the load balancer may base the distribution of connections on any combination of the factors described above and/or other factors.

After determining how to distribute the connection requests, the load balancer 150 may forward the connection requests to the ESSDs 154 as shown in FIG. 4. Specifically, connection request Connect B from Initiator-1 may be forwarded to ESSD-1 at operation 405, connection request Connect C from Initiator-2 may be forwarded to ESSD-1 at operation 406, connection request Connect D from Initiator-1 may be forwarded to ESSD-4 at operation 407, and connection request Connect A from Initiator-2 may be forwarded to ESSD-2 at operation 408.

The load balancer may then wait for confirmations from the ESSDs 154 that the connection has been established and forward the confirmations to the corresponding initiators 152, for example, in the order the confirmations are received from the ESSDs 154. For example, in response to the connection request Connect A, ESSD-2 may send a confirmation Established A to the load balancer 150 at operation 409 which may then forward the confirmation to Initiator-2 at operation E-410. The process may continue until the establishment of all four connection requests are confirmed to the initiators 152.

Thus, transport connections requested by the initiators 152 may be established with ESSDs 154 as determined by the load balancer 150. In some embodiments, the transport connections may be established in a pass-through configuration and terminated at the corresponding ESSDs 154.

In the embodiment illustrated in FIG. 4, the operations are example operations, and may involve various additional operations not explicitly illustrated. In some embodiments, some of the illustrated operations may be omitted. In some embodiments, one or more of the operations may be performed by components other than those illustrated in FIG. 4. Additionally, in some embodiments, the temporal order of the operations may be varied. Moreover, as mentioned above, the figures are not necessarily drawn to scale, and thus, any proportions and/or relations between elements, events, time intervals, and/or the like may be longer or shorter based on network delays, computational delays, and/or the like.

Figure 5:
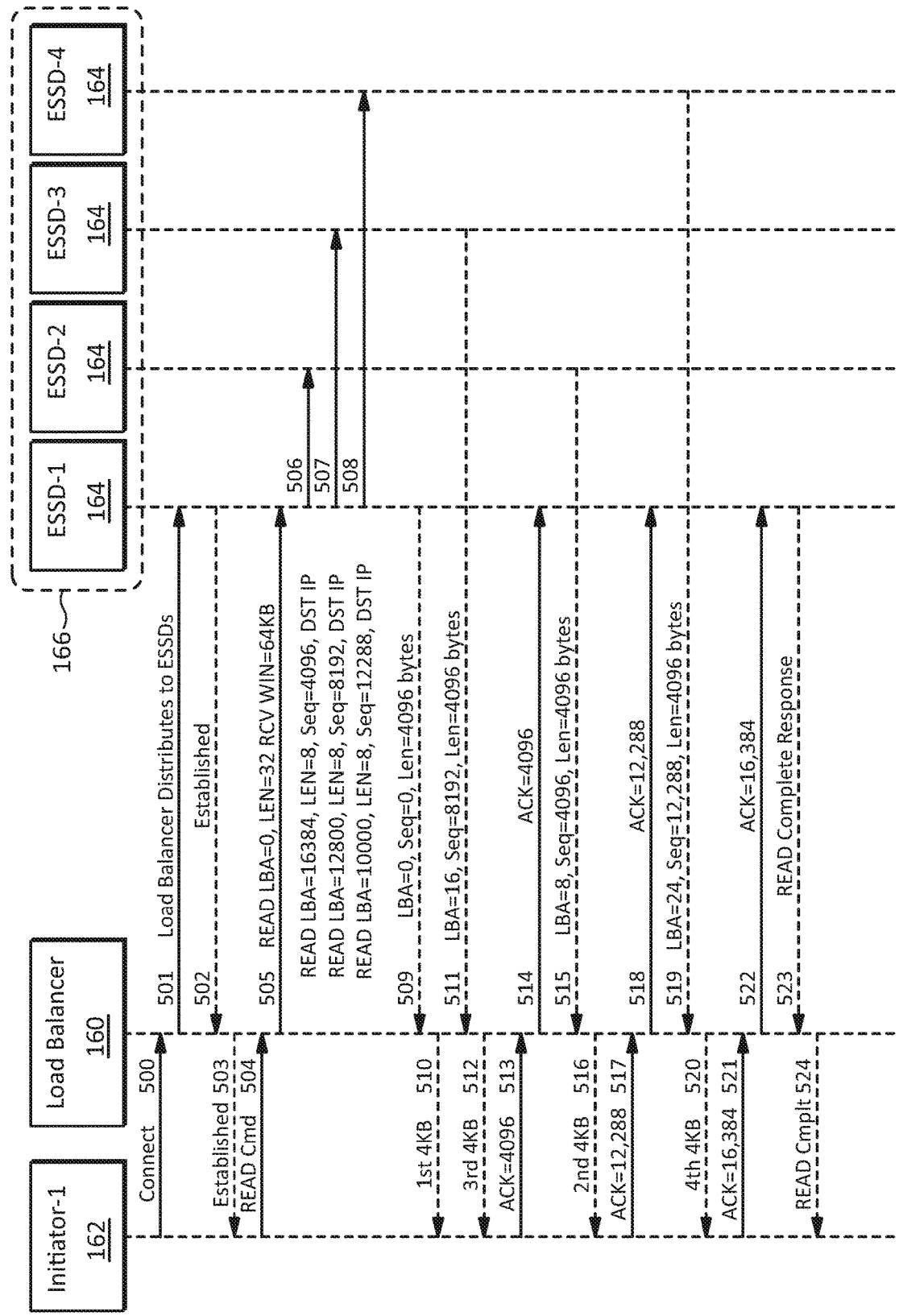
FIG. 5 illustrates a sequence diagram for an example embodiment of a read operation in which data from a group of fabric-attached storage devices may be transferred to an initiator according to this disclosure.

FIG. 5 illustrates a sequence diagram for an example embodiment of a read operation in which data from a group of fabric-attached storage devices may be transferred to an initiator according to this disclosure. The method illustrated in FIG. 5 may be used, for example, with any of the systems and/or components described in this disclosure such as those illustrated in FIGS. 1-3 and 8-9.

In the embodiment illustrated in FIG. 5, a load balancer 160 may distribute a shared transport connection, for example, a TCP connection, between an initiator 162 and a device group 166 of fabric-attached storage devices (e.g., ESSDs) 164. The device group 166 may be configured to operate as a single logical storage device transparently to the initiator 162.

The method may begin at operation 500 when the initiator 162 sends a connection request to the load balancer 160. The load balancer 160 may forward the connection request to ESSD-1 at operation 501. In this example embodiment, ESSD-1 may operate as a primary device for the device group that may include ESSD-1, ESSD-2, ESSD-3, and ESSD-4. At operation 502, ESSD-1 may send a confirmation to the load balancer 160 indicating that a TCP connection has been established. The load balancer 160 may then forward the confirmation to the initiator 162 at operation 503. In this example embodiment, the TCP connection may be established through the load balancer 160 in a pass-through configuration that may terminate at ESSD-1 but with a split port space. That is, all four of the ESSDs 164 in the group may use the same IP address but different port numbers to avoid conflicts between the ESSDs when receiving and/or transmitting on the TCP connection.

A read operation may begin when the initiator 162 sends a read command at operation 504 which the load balancer 160 may forward to ESSD-1 at operation 505. The read command may include one or more parameters such as a logical block address (LBA), a number of blocks to read (LEN), a receive window size (RCV WIN), and/or the like. In this example, the read command from the initiator 162 may specify a data read of 32 blocks (LEN=32), wherein each block may be, for example, 512 bytes beginning at LBA 0.

In response to the read command, ESSD-1 may determine where the requested read data is stored in the group of ESSDs 164 by consulting, for example, a mapping table, array, and/or other data structure. The mapping data structure may be maintained, for example, at and/or by the primary device ESSD-1. In some embodiments, copies may also be maintained at and/or by the load balancer 160 and/or any of the other ESSDs in the device group 166.

In this example, the data requested by the read command may be distributed across all four of the ESSDs in the device group 166. To begin the process of transferring the data from the ESSDs 164 to the initiator 162, ESSD-1 may transmit one or more read messages to each of the ESSDs 164 that may have data that is responsive to the read command. A read message may include one or more parameters such as a read logical block address (RD LBA), a number of blocks to read (LEN), a TCP sequence number (Seq), a destination IP address (DST IP), and/or the like. FIG. 5 illustrates examples of read message parameters that may be sent to ESSD-2, ESSD-3, and ESSD-4 at operations 506, 507, and 508, respectively.

In some embodiments, the RD LBA included in a read message to an ESSD may be a local LBA for the ESSD. That is, the mapping data structure may enable ESSD-1 (the primary ESSD), to tell each of the other ESSDs in the group 166 where the requested data is located in its own storage media. In some embodiments, for example, where a copy of the mapping data structure may be maintained at each ESSD 164, the ESSD may be able to determine the local LBA based on a global LBA for the group 166.

Using the parameters such as TCP sequence number and destination IP address sent with the read message, each of the ESSDs in the group 166 may read the requested data from their storage media and transfer the read data directly to the initiator 162 using the distributed TCP connection through the load balancer 160. This is illustrated, for example, at operation 509 where ESSD-1 may transmit approximately 4096 bytes of data approximately (eight blocks of approximately 512 bytes) using TCP sequence 0 to load balancer 160, which may then forward the data to the initiator 162 at operation 510. In some embodiments, the read data may be transferred using a storage protocol such as, for example, NVMe-oF in conjunction with TCP.

In this example, ESSD-3, ESSD-2, and ESSD-4 may each transmit their eight blocks of data at operations 511, 515, and 519, using TCP sequences 8192, 4096, and 12,288, respectively. The data blocks may then be forwarded to the initiator 162 by the load balancer 160 at operations 512, 516, and 520, respectively. Thus, the TCP receive window space may be distributed between the different ESSDs 164. The original read command from the initiator may 162 specify a data read of approximately 32 blocks (LEN=32), wherein each block may be approximately 512 bytes, for a total of approximately 16K bytes. Thus, the resulting four data transmissions of approximately 4096 bytes (Len-4096) from each of the ESSDs in the group 166 may transmit a total of approximately 16K bytes.

As the initiator 162 receives the read data from the ESSDs, it may send acknowledgments (ACKs) back to ESSD-1 as shown at operations 513, 517, and 521, which may then be forwarded at operations 514, 518, and 522, respectively. After ESSD-1 receives the final ACK, it may send a read complete response at operation 523, which may be forwarded to the initiator 162 at operation 524, thereby completing the read operation.

Depending on the order in which the ESSDs 164 transferred the read data, the initiator 162 may rearrange the received data using the TCP sequence numbers to restore the data to its original order.

In some embodiments, an I/O command context may be created and/or maintained, for example, at the load balancer 160 and/or ESSD-1. A command context may be created, for example, when the read command is received at the beginning of the read operation and then discarded after completion of the read command. A command context may contain information that may keep track of which of the ESSDs 164 contain data responsive to the read command, which of the ESSDs 164 have transmitted their read data, which acknowledgments have been received from the initiator 162, and/or the like.

In some embodiments, at least a portion of the read data may be transferred to a location other than the initiator. For example, in some embodiments, a read command from the initiator may include a destination IP address that may be for a third party that is different from the initiator. In such an embodiment, the third party destination IP address may be passed to the ESSDs 164 in the read messages, and the ESSDs 164 may then send the read data directly to the third party destination IP through the load balancer 160. Such an embodiment may be useful, for example, in video streaming and/or gaming applications where the initiator 162 may operate as a metadata server to manage streaming data flows to third party users.

In the embodiment illustrated in FIG. 5, the operations are example operations, and may involve various additional operations not explicitly illustrated. In some embodiments, some of the illustrated operations may be omitted. In some embodiments, one or more of the operations may be performed by components other than those illustrated in FIG. 5. For example, in some embodiments, one or more of the read messages may be sent from the load balancer 160 instead of, or in addition to, the primary ESSD. As another example, in some embodiments, the at least some of the acknowledgments may be accumulated by the load balancer 160 instead of, or in addition to, the primary ESSD. Additionally, in some embodiments, the temporal order of the operations may be varied. Moreover, as mentioned above, the figures are not necessarily drawn to scale, and thus, any proportions and/or relations between elements, events, time intervals, and/or the like may be longer or shorter based on network delays, computational delays, and/or the like.

Figure 6:
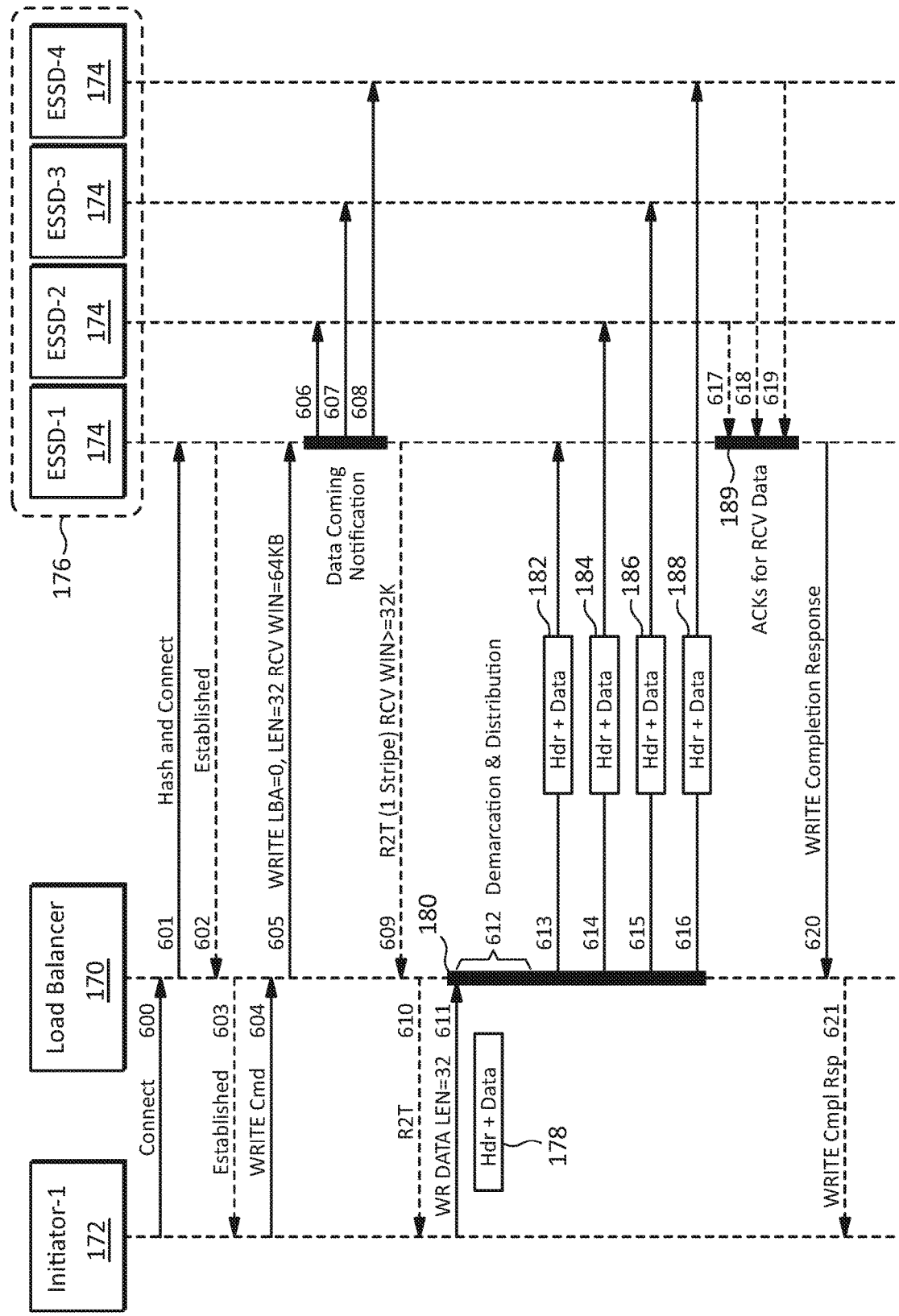
FIG. 6 illustrates a sequence diagram for an example embodiment of a write operation in which data from an initiator may be distributed to a group of fabric-attached storage devices by a load balancer according to this disclosure.

FIG. 6 illustrates a sequence diagram for an example embodiment of a write operation in which data from an initiator may be distributed to a group of fabric-attached storage devices by a load balancer according to this disclosure. The method illustrated in FIG. 6 may be used, for example, with any of the systems and/or components described in this disclosure such as those illustrated in FIGS. 1-3 and 8-9.

In the embodiment illustrated in FIG. 6, a distributed transport connection may be established between an initiator 172 and a device group 176 of fabric-attached storage devices (e.g., ESSDs) 174 through a load balancer 170 in a manner similar to that described in the embodiment illustrated in FIG. 5. Also similar to the embodiment illustrated in FIG. 5, the device group 176 illustrated in FIG. 6 may be configured to operate as a single logical storage device transparently to the initiator 172, and ESSD-1 may operate as a primary device for the device group 176 that may include ESSD-1, ESSD-2, ESSD-3, and ESSD-4.

A write operation may begin when the initiator 172 sends a write command at operation 604 which the load balancer 170 may forward to ESSD-1 at operation 605. The write command may include one or more parameters such as a logical block address (LBA), a number of blocks to read (LEN), a receive window size (RCV WIN), and/or the like.

In this example, the write command from the initiator 172 may specify a data write of approximately 32 blocks (LEN-32), wherein each block may be, for example, approximately 512 bytes beginning at LBA 0.

In some embodiments, ESSD-1 may send one or more data coming notifications to ESSD-2, ESSD-3, and ESSD-4 at operations 606, 607, and 608, respectively.

At operation 609, ESSD-1 may send a ready-to-transfer (R2T) notification to the load balancer 170 which may be forwarded to the initiator 172 at operation 610. The R2T notification may include one or more parameters such as an indicator that the group 176 of ESSDs may be configured for RAID-0 (1 Stripe), a receive window size (RCV WIN), and/or the like.

At operation 611, the initiator 172 may send write data 178, which may include header and data portions, to the load balancer 170 which may store the write data in a buffer 180. The write data may be accompanied by one or more parameters such as a write data length (WR DATA LEN) and/or other parameters. In some embodiments, the write data may be transferred using a storage protocol such as, for example, NVMe-oF in conjunction with TCP.

At operation 612, the load balancer 170 may determine a demarcation and/or distribution of the write data between the ESSDs 174. The demarcation and/or distribution may be based on a wide variety of factors. For example, in some embodiments, the load balancer 170 may base the demarcation and/or distribution at least in part on the amount of storage available at each of the ESSDs 174. In some embodiments, the load balancer may base the demarcation and/or distribution at least in part on various load balancing algorithms such as round robin, least connections, random distribution, and/or the like, or any combination thereof. In some embodiments, the load balancer 170 may base the demarcation and/or distribution on any combination of the factors described above and/or other factors.

After determining the demarcation and/or distribution of the write data, the load balancer 170 may transfer portions 182, 184, 186, and 188 of the write data directly to ESSD-1, ESSD-2, ESSD-3, and ESSD-4 at operations 613, 614, 615, and 616, respectively, through the distributed transport connection. Each of the write data portions 182, 184, 186, and 188 may include a corresponding header and data portion. In this example, the write data is distributed between all four ESSDs 174 in the group 176, but in other situations, the write data may be distributed in any manner between any number of the ESSDs 174.

In some embodiments, ESSD-1 may accumulate data received acknowledgments, which may be received at operations 617, 618, and 619 in a buffer 189. ESSD-1 may then send a write completion response to the load balancer 170 at operation 620, which may then be forwarded to the initiator 172 at operation 621, thereby completing the data write operation.

In the embodiment illustrated in FIG. 6, the operations are example operations, and may involve various additional operations not explicitly illustrated. In some embodiments, some of the illustrated operations may be omitted. In some embodiments, one or more of the operations may be performed by components other than those illustrated in FIG. 6. For example, in some embodiments, the data coming notifications may be omitted. As another example, in some embodiments, the data received acknowledgments may be accumulated at the load balancer 170 instead of, or in addition to, ESSD-1. Additionally, in some embodiments, the temporal order of the operations may be varied. Moreover, as mentioned above, the figures are not necessarily drawn to scale, and thus, any proportions and/or relations between elements, events, time intervals, and/or the like may be longer or shorter based on network delays, computational delays, and/or the like.

Figure 7:
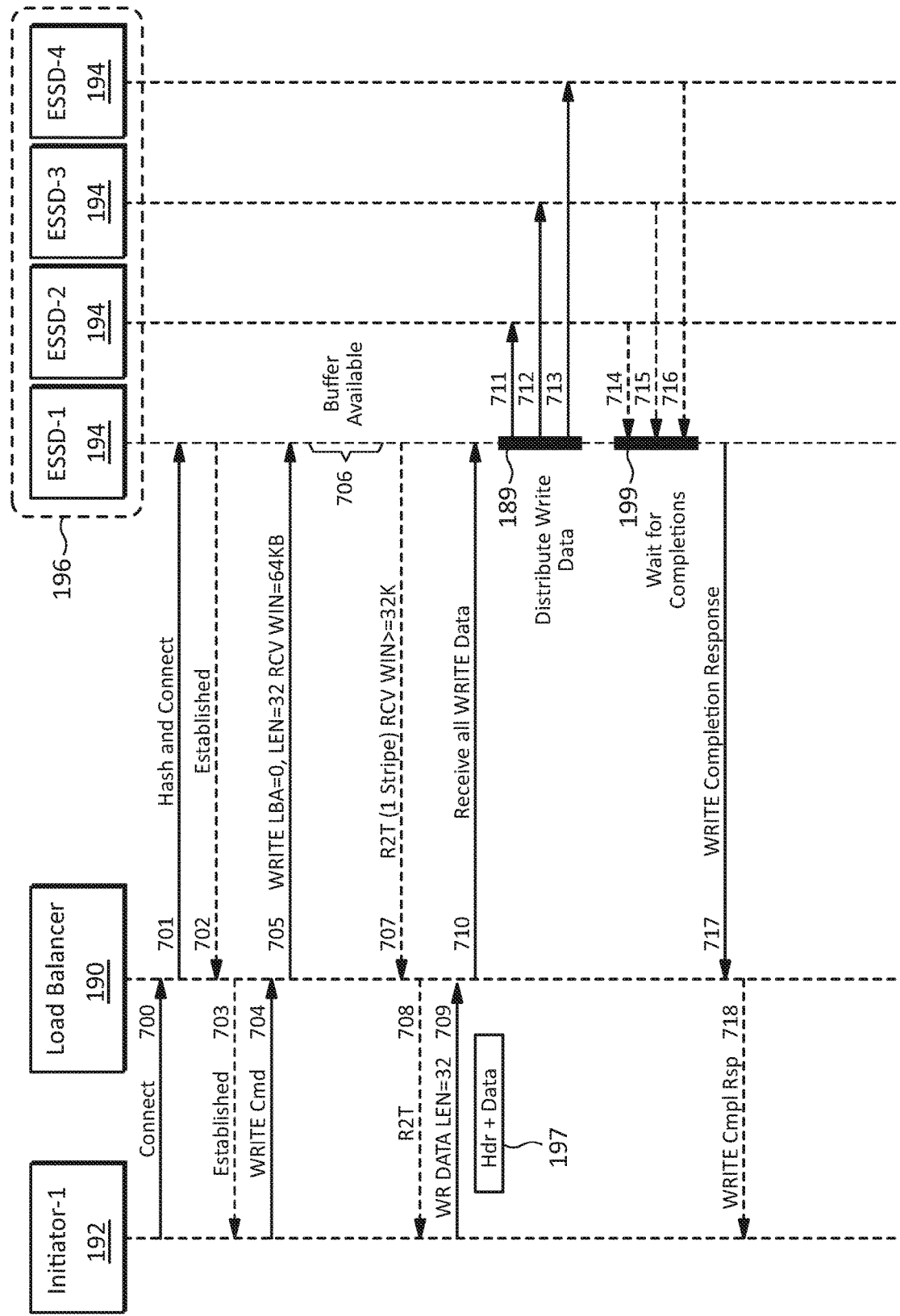
FIG. 7 illustrates a sequence diagram for another example embodiment of a write operation in which data from an initiator may be distributed to a group of fabric-attached storage devices by one of the devices in the group according to this disclosure.

FIG. 7 illustrates a sequence diagram for another example embodiment of a write operation in which data from an initiator may be distributed to a group of fabric-attached storage devices by one of the devices in the group according to this disclosure. The method illustrated in FIG. 7 may be used, for example, with any of the systems and/or components described in this disclosure such as those illustrated in FIGS. 1-3 and 8-9.

In the embodiment illustrated in FIG. 7, a distributed transport connection may be established between an initiator 192 and a device group 196 of fabric-attached storage devices (e.g., ESSDs) 194 through a load balancer 190 in a manner similar to that described with respect to the embodiments illustrated in FIGS. 5 and 6. Also similar to the embodiments illustrated in FIGS. 5 and 6, the device group 196 illustrated in FIG. 7 may be configured to operate as a single logical storage device transparently to the initiator 192, and ESSD-1 may operate as a primary device for the device group 196 that may include ESSD-1, ESSD-2, ESSD-3, and ESSD-4.

In the embodiment illustrated in FIG. 7, a write operation may begin when the initiator 192 sends a write command at operation 704 which the load balancer 190 may forward to ESSD-1 at operation 705. The write command may include one or more parameters such as a logical block address (LBA), a number of blocks to read (LEN), a receive window size (RCV WIN), and/or the like. In this example, the write command from the initiator 192 may specify a data write of approximately 32 blocks (LEN=32), wherein each block may be, for example, approximately 512 bytes beginning at LBA 0. In some embodiments, the write data may be transferred using a storage protocol such as, for example, NVMe-oF in conjunction with TCP.

At operation 706, ESSD-1 may determine how much, if any buffer space it has available to receive write data from the initiator 192. At operation 707, ESSD-1 may send a ready-to-transfer (R2T) notification to the load balancer 190 which may be forwarded to the initiator 192 at operation 708. The R2T notification may include one or more parameters such as an indicator that the group 196 of ESSDs may be configured for RAID-0 (1 Stripe), a receive window size (RCV WIN), and/or the like. In some embodiments, the one or more parameters may include information on how much buffer space ESSD-1 has available.

At operation 709, the initiator 192 may send write data 197, which may include header and data portions, to the load balancer 190 which may forward the write data to ESSD-1 at operation 710. The write data may be accompanied by one or more parameters such as a write data length (WR DATA LEN) and/or other parameters. The primary storage device ESSD-1 may then store the write data in a buffer 189 and determine a demarcation and/or distribution of the write data between the ESSDs 174.

ESSD-1 may determine the demarcation and/or distribution based on a wide variety of factors similar to those used by the load balancer 170 in the embodiment illustrated in FIG. 6. After determining the demarcation and/or distribution of the write data, the primary drive ESSD-1 may retain a portion of the write data for storage using its own storage media, and/or transfer portions the write data to ESSD-2, ESSD-3, and/or ESSD-4 operations 711, 712, and 713, respectively. In some embodiments, ESSD-1 may accumulate write completion acknowledgments, which may be received at operations 714, 715, and 716 in a buffer 199. ESSD-1 may then send a write completion response to the load balancer 190 at operation 717, which may then be forwarded to the initiator 192 at operation 718, thereby completing the data write operation.

In the embodiment illustrated in FIG. 7, the operations are example operations, and may involve various additional operations not explicitly illustrated. In some embodiments, some of the illustrated operations may be omitted. In some embodiments, one or more of the operations may be performed by components other than those illustrated in FIG. 7. For example, in some embodiments, the write complete acknowledgments may be accumulated at the load balancer 190 instead of, or in addition to, ESSD-1. Additionally, in some embodiments, the temporal order of the operations may be varied. Moreover, as mentioned above, the figures are not necessarily drawn to scale, and thus, any proportions and/or relations between elements, events, time intervals, and/or the like may be longer or shorter based on network delays, computational delays, and/or the like.

In some embodiments, the transfers of information such as notifications, write data, read data, read messages, acknowledgments, completions, and/or the like between the drives in a device group may be performed through any suitable communication channels. For example, in some embodiments, one or more separate protocols may be used to implement one or more virtual local area networks (VLANs) for storage devices in a group. These one or more protocols may be carried by the network fabric that interconnects the storage devices in a group and carries the shared transport connection and/or by any other communication channel such as, for example, a separate physical network. In some embodiments, these one or more additional protocols may be used to allocate reserved bandwidth for a device group.

In some embodiments, a low-latency communication protocol such as embedded remote procedure call (eRPC) may be used to transfer command and/or response information between storage devices in a group. This may be used, for example, for the read messages illustrated in FIG. 5 and/or the data coming notifications and/or completion acknowledgments illustrated FIGS. 6 and 7. An example implementation of a read message may include, for example, any number of the following parameters: VLAN identifier, source IP address, destination IP address, TCP sequence number, length of transfer, blocks to read (which may include, e.g., namespace, block address, length), other TCP and/or IP flags requested by a primary device, and/or the like.

In some embodiments, transfers of read and/or write data between storage devices in a group may be performed, for example, by a VLAN that may use a protocol such as RDMA RoCE). In some embodiments, a quality-of-service (QoS) environment may be established to avoid potential performance issues.

Figure 8:
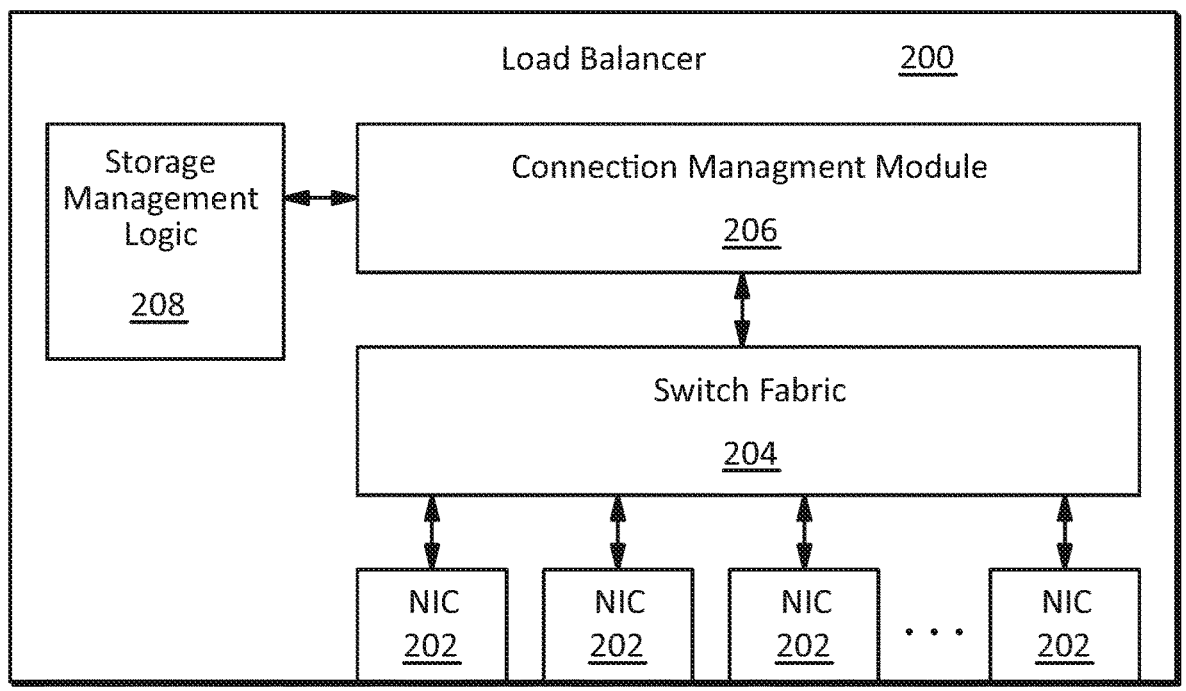
FIG. 8 illustrates an example embodiment of a load balancer according to this disclosure.

FIG. 8 illustrates an example embodiment of a load balancer according to this disclosure. The load balancer 200 illustrated in FIG. 8 may be used, for example, to implement any of the methods, apparatus, features, and/or the like described in this disclosure. The load balancer 200 may include one or more network interface controllers (NICs) 202 that may be used, for example, to establish network connections between any number of initiators, switches, fabric-attached storage devices, and/or the like. A switch fabric 204 may establish and maintain network connections between network devices connected to the NICs 202. A connection management module 206 may control the establishment, maintenance, termination, mapping, and/or the like, of connections between network devices at a network layer, a transport layer and/or the like. Storage management logic 208 may implement any of the storage-related functionality and/or features according to this disclosure. For example, if the load balancer 200 is used to implement the method illustrated in FIG. 6, the storage management logic 208 may be used to determine the demarcation and/or distribution of the write data between the ESSDs in the device group.

Any of the components and/or functionality of the embodiment illustrated in FIG. 8 may be implemented with hardware, firmware, software, or any combination thereof. Moreover, any of the various components may be implemented as separate components, integrated together, or arranged in any other suitable configuration. For example, in some embodiments, the switch fabric 204 may be implemented with hardware switches, while in other embodiments some or all of the switch fabric may be implemented in software. In some embodiments, the load balancer 200 may be implemented by adding storage management logic 208 to an existing network load balancer.

Figure 9:
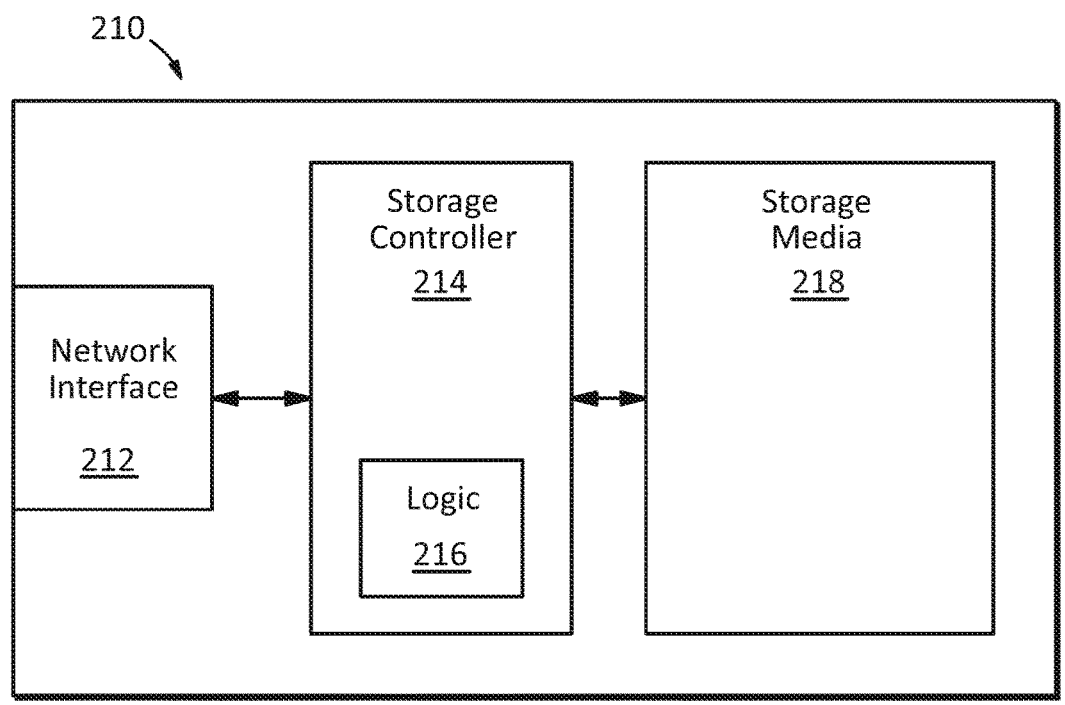
FIG. 9 illustrates an example embodiment of a fabric-attached storage device according to this disclosure.

FIG. 9 illustrates an example embodiment of a fabric-attached storage device according to this disclosure. The storage device 210 illustrated in FIG. 9 may be used, for example, to implement any of the methods, apparatus, features, and/or the like described in this disclosure. The storage device 210 may include one or more network interfaces 212, a storage controller 214 and a storage media 218. The storage medium 218 may be implemented with magnetic, solid state, optical, or any other type of data storage technology. The one or more network interfaces 212 may enable the storage device to connect to a network fabric based on, for example, Ethernet, Fibre Channel, InfiniBand, and/or the like. The storage controller 214 may control the overall operation of the storage device 210. The storage controller 214 may include logic 216 that may be used to implement any of the functionality and/or features according to this disclosure. For example, if the storage device 210 is used to implement any of the storage devices in the device group illustrated in FIG. 5, the logic 216 may include functionality for the primary ESSD to send read messages to the other devices instructing them to send read data to the initiator, or for the other ESSDs to receive the read messages and respond accordingly. As another example, if the storage device 210 is used to implement any of the storage devices in the device group illustrated in FIG. 6, the logic 216 may include functionality for the primary ESSD to determine the demarcation and/or distribution of the write data between the ESSDs in the device group.

The network interface 212 and storage controller 214 may be implemented as separate components or integrated into one or more components using hardware, software or any combination thereof. For example, the storage controller 214 may be implemented with any suitable data processing apparatus including a microprocessor, microcontroller, etc., implemented as a system-on-chip (SOC), field programmable gate array (FPGA), a combination of standard and/or custom integrated circuits (ICs), application specific integrated circuits (ASICs), and the like, or any combination thereof.

Figure 10:
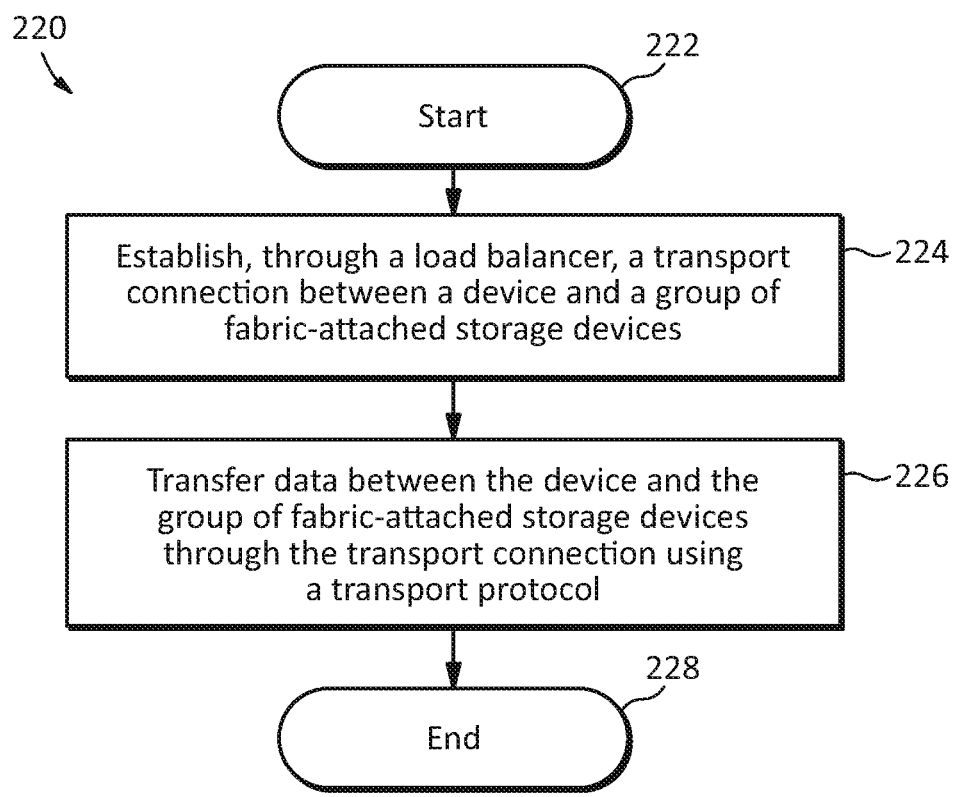
FIG. 10 illustrates a flow chart of an example embodiment of a method for providing virtualized storage according to this disclosure.

FIG. 10 illustrates a flow chart of an example embodiment of a method for providing virtualized storage according to this disclosure. The method 220 illustrated in FIG. 10 may begin at operation 222. At operation 224, a transport connection may be established through a load balancer between a device and a group of fabric-attached storage devices. At operation 226, data may be transferred between the device and the group of fabric-attached storage devices through the transport connection using a transport protocol. In some embodiments, the group of fabric-attached storage devices may include two or more fabric-attached storage devices and may be accessed by the device as a logical storage device. The method may end at operation 228.

In the embodiment illustrated in FIG. 10, the operations are example operations, and may involve various additional operations not explicitly illustrated. In some embodiments, some of the illustrated operations may be omitted. In some embodiments, one or more of the operations may be performed by components other than those described in FIG. 10. Additionally, in some embodiments, the temporal order of the operations may be varied.

In some embodiments, and depending on the implementation details, one or more systems, methods, and/or apparatus according to this disclosure may overcome one or more potential problems with fabric-attached storage devices. For example, some protocols may only provide one transport connection per device/driver pair. Thus, to spread storage across multiple fabric-attached devices, a host central processing unit (CPU) may handle processing related to managing volumes spanning across devices. This may also increase the number of I/O operations handled by a host CPU. However in some embodiments, and depending on the implementation details, one or more systems, methods, and/or apparatus according to this disclosure may enable multiple fabric attached storage devices to be accessed as a single logic device by a host CPU. Moreover, in some embodiments, and depending on the implementation details, one or more systems, methods, and/or apparatus according to this disclosure may enable fabric-attached storage devices to be virtualized as an aggregated volume without any changes to a transport protocol such as TCP and/or RDMA.

The embodiments disclosed herein may be described in the context of various implementation details, but the principles of this disclosure are not limited these or any other specific details. Some functionality has been described as being implemented by certain components, but in other embodiments, the functionality may be distributed between different systems and components in different locations and having various user interfaces. Certain embodiments have been described as having specific processes, steps, combinations thereof, and/or the like, but these terms may also encompass embodiments in which a specific process, step, combinations thereof, and/or the like may be implemented with multiple processes, steps, combinations thereof, and/or the like, or in which multiple processes, steps, combinations thereof, and/or the like may be integrated into a single process, step, combinations thereof, and/or the like. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. In some embodiments, a fabric-attached storage device may only make a partition or other portion of the device's storage media available for aggregation in a group of devices. Thus, in some embodiments, storage device may also refer to a partition or other portion within a device. Moreover, the various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. A method of providing virtualized storage, the method comprising:
   establishing, using a load balancer, a transport connection between a device and two or more fabric-attached storage drives; and
   transferring, based on a write command, data between the device and at least two of the two or more fabric-attached storage drives using the transport connection using a transport protocol;
   wherein the two or more fabric-attached storage drives are accessed by the device as a logical storage drive;
   wherein a first one of the two or more fabric-attached storage drives comprises a first network adapter coupled to the device using a network fabric;
   wherein a second one of the two or more fabric-attached storage drives comprises a second network adapter coupled to the device using a network fabric; and
   wherein the two or more fabric-attached storage drives use a network address associated with the two or more fabric-attached storage-drives; and
   wherein the method further comprises:
      storing, based on the write command, using the network address and a first port identifier, a first portion of the data at the first one of the two or more fabric-attached storage drives; and
      storing, based on the write command, using the network address and a second port identifier, a second portion of the data at the second one of the two or more fabric-attached storage drives.

2. The method of claim 1, wherein the network address comprises an Internet Protocol (IP) address.

3. The method of claim 1, wherein the transport protocol comprises Transmission Control Protocol (TCP).

4. The method of claim 1, wherein the device and one or more of the at least two fabric-attached storage drives exchange data use a Nonvolatile Memory Express Over Fabric (NVMe-oF) protocol.

5. The method of claim 1, wherein a receive window space of the transport connection is shared between at least two of the two or more fabric-attached storage drives.

6. The method of claim 1, wherein at least two of the two or more fabric-attached storage drives transfer data to the device using at least a first transport protocol sequence number and a second transport protocol sequence within the transport connection in response to a read command.

7. The method of claim 1, wherein one of the two or more fabric attached storage drives accumulates one or more acknowledgements from the device in response to the device receiving read data.

8. The method of claim 1, wherein the load balancer transfers data from the device directly to one or more of the two or more fabric attached storage drives using the transport connection for a write operation.

9. The method of claim 1, wherein, for a write operation:
   the load balancer transfers write data from the device to a first one of the two or more fabric attached storage drives; and
   the first one of the two or more fabric attached storage drives transfers at least part of the write data from the device to a second one of the two or more fabric attached storage drives.

10. The method of claim 9, wherein the first one of the two or more fabric attached storage drives determines a distribution of the write data between the two or more fabric attached storage drives.

11. A storage system comprising:
- a first fabric-attached storage drive comprising a first network interface;
- a second fabric-attached storage drive comprising a second network interface; and
- a load balancer connected, using a network fabric, to the first fabric-attached storage drive using the first network interface and the second fabric-attached storage drive using the second network interface;
- wherein the load balancer is configured to transfer, based on a write command, data between a device and the first and second fabric-attached storage drives using a transport connection that is shared between the first and second fabric-attached storage drives;
- wherein the load balancer and the first and second fabric-attached storage drives are configured to use a network address associated with the first and second fabric-attached storage drives;
- wherein the first fabric-attached storage drive is configured to store, based on the write command, using the network address and a first port identifier, a first portion of the data; and
- wherein the second fabric-attached storage drive is configured to store, based on the write command, using the network address and a second port identifier, a second portion of the data.

12. The storage system of claim 11, wherein the load balancer is configured to transfer data between the device and the first and second fabric-attached storage drives using a shared window space of the transport connection.

13. The storage system of claim 11, wherein the first and second fabric-attached storage drives are configured to operate as a logical storage drive.

14. A storage drive comprising:
- a storage medium;
- a network fabric interface; and
- a storage controller configured to transfer data between the storage medium and a device using the network fabric interface using a transport connection;
- wherein the storage controller is configured to share the transport connection with another storage drive that is fabric-attached;
- wherein the storage controller is configured to use a network address associated with the other storage drive; and
- wherein the storage controller comprises logic configured to determine a distribution of write data between the storage drive using the network address and a first port identifier and the other storage drive using the network address and a second port identifier.

15. The storage drive of claim 14, wherein:
- the storage controller comprises logic configured to send a message to the other storage drive in response to a read command from the device; and
- the message includes information to enable the other storage drive to transfer read data to the device using the transport connection.

16. The storage drive of claim 14, wherein:
- the storage controller comprises logic configured to receive a message from the other storage drive; and
- the message includes information to enable the storage drive to transfer read data to the device using the transport connection.

17. The storage drive of claim 14, wherein the device is a first device, and the storage controller comprises logic configured to send read data to a second device in response to a read command from the first device.

* * * * *